United States Patent
Sawtell

(10) Patent No.: US 7,417,879 B2
(45) Date of Patent: Aug. 26, 2008

(54) PFM AND CURRENT CONTROLLED SWITCHING REGULATOR

(75) Inventor: Carl K. Sawtell, San Jose, CA (US)

(73) Assignee: Micrel, Inc., San Jose, CA (US)

( * ) Notice: Subject to any disclaimer, the term of this patent is extended or adjusted under 35 U.S.C. 154(b) by 195 days.

(21) Appl. No.: 11/371,547

(22) Filed: Mar. 8, 2006

(65) Prior Publication Data

US 2007/0210772 A1    Sep. 13, 2007

(51) Int. Cl.
*H02M 7/06* (2006.01)
(52) U.S. Cl. .............................. 363/89; 363/80; 323/222
(58) Field of Classification Search ............. 363/79–82, 363/89, 44–45, 90, 126; 323/282–288, 222, 323/351
See application file for complete search history.

(56) References Cited

U.S. PATENT DOCUMENTS

| | | | |
|---|---|---|---|
| 4,608,625 A | 8/1986 | Josephson et al. | |
| 4,683,529 A * | 7/1987 | Bucher, II | 363/44 |
| 5,146,398 A * | 9/1992 | Vila-Masot et al. | 363/89 |
| 5,481,178 A | 1/1996 | Wilcox et al. | |
| 6,304,067 B1 | 10/2001 | Wrathall | |
| 6,809,560 B1 | 10/2004 | Wrathall | |
| 6,972,974 B2 | 12/2005 | Inn et al. | |

* cited by examiner

*Primary Examiner*—Rajnikant B Patel
(74) *Attorney, Agent, or Firm*—Patent Law Group LLP; Carmen C. Cook

(57) ABSTRACT

A circuit and method for controlling a switching regulator utilize a combination of variable off-time control (or frequency control) and variable peak current control to achieve high efficiency at a wide range of load conditions. A non-linear control circuit receives an error voltage and generates a first control signal for controlling a frequency control circuit and a second control signal for controlling a peak current control circuit. The frequency control circuit and the peak current control circuit operate in conjunction over the entire range of load conditions with the frequency control dominates at light load (or low power) conditions and the variable peak current control dominates at moderate to heavy load (or high power) conditions. The switching regulator transitions smoothly between frequency control and peak current control with continous loop gain throughout the transition region.

22 Claims, 5 Drawing Sheets

PFM AND CURRENT CONTROLLED SWITCHING REGULATOR

FIELD OF THE INVENTION

The invention relates to switching regulators and, in particular, to a switching regulator implementing variable frequency and peak current control for maintaining high efficiency at all load conditions.

DESCRIPTION OF THE RELATED ART

DC voltage regulators or switching regulators operate to convert energy from one DC voltage level to another DC voltage level. A switching regulator, sometimes referred to as a switching mode power supply, provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the switching regulator is well known and is generalized as follows. A power switch is turned on to apply energy to an inductor to allow the current through the inductor to build up. When the power switch is turned off, the voltage across the inductor reverses and charges are transferred onto an output capacitor and the load. A relatively constant output voltage is maintained by the output capacitor.

In general, switching regulators are operated in two modes. In the discontinuous mode, the inductor current builds up from zero during the power switch "on" time. During the power switch "off" time, the energy in the inductor is completely transferred to the output capacitor and output load. In the continuous mode, the inductor current during the power switch "off" time does not decay to zero. Rather, the power switch turns on to deliver energy to the inductor so that the current into the inductor is continuous, never going to zero.

A problem faced by most types of switching regulators is maintaining high efficiency at light load conditions. Switch regulators typically become very inefficient at light load (low output current) conditions. The efficiency of a switching regulator is limited by several factors, such as losses that are proportional to the output power, fixed losses for each switching cycle, and losses which are constant independent of the voltage conversion process (e.g. quiescent supply current of the control circuit).

Several solutions have been applied to ensure good efficiency at low power or light load condition. One solution is the use of pulse frequency modulation (PFM). When the PFM technique is applied, the switching frequency is made as a function of the output power. By switching less often at low power, the switching losses also reduce at light load. Another solution is the use of burst mode. In the burst mode, the switching regulator is run briefly at light load conditions. If the control loop senses that very little energy needs to be delivered, the switching regulator runs for a few cycles and then shuts down the entire circuit for a period of time. When the circuit powers back up, the switching regulator again delivers power to the load, and if very little energy is needed to maintain regulation, then the circuit shuts down the control loop (including its quiescent operating current) again.

The conventional solutions to maintaining efficiency at light load conditions are dissatisfactory for several reasons. First, the PFM technique is problematic if a very wide range of powers is expected. In the simplest operational scenario, the switching frequency of a switching regulator is proportional to the output power. When the output power varies over a wide range, the switching frequency may therefore modulate over orders of magnitude. In most applications, it is disadvantageous to allow the switching frequency to modulate down into the audio range, and it is also desirable to prevent the high switching frequency to exceed more than a couple Megahertz. Thus, the PFM technique only provides two orders of magnitude range over which modulation should occur. The frequency range limitation makes the PFM technique not practical for all applications. Second, the burst mode solution has several disadvantages. A main disadvantage of the burst mode slow response time. Under the burst mode, the switching regulator circuit is shut off completely at light load conditions and is turned on only periodically. If the load steps from low to high power demand, the switching regulator may not respond in a timely manner if the load changes occur during when the switching regulator is turned off.

Therefore, a switching regulator capable of maintaining high efficiency at light load conditions while avoiding the aforementioned shortcomings of the prior art is desired.

SUMMARY OF THE INVENTION

According to one embodiment of the present invention, a circuit for controlling a switching regulator includes an error amplifier, a first, second and third control circuits. The switching regulator receives an input voltage and includes a switch circuit coupled to generate a switching output voltage and an output circuit coupled to receive the switching output voltage and to supply current at a regulated output voltage to a load. The error amplifier has a first input node coupled to receive a first voltage indicative of the regulated output voltage, a second input node coupled to receive a reference voltage and an output node providing an error voltage responsive to the difference between the first voltage and the reference voltage.

The first control circuit has an input node receiving the error voltage, a first output node providing a first control signal and a second output node providing a second control signal. The first control circuit generates the first control signal having a magnitude proportional to the error voltage for error voltages in a first voltage range where the first control signal has a maximum value for error voltage values greater than the first voltage range. The first control circuit further generates the second control signal having a minimum value for error voltages in a second voltage range where the second control signal has a magnitude proportional to the error voltage for error voltages greater than the second voltage range. The first and second voltage ranges are associated with low voltage values of the error voltage.

The second control circuit is coupled to receive the first control signal and provides an output signal responsive to the first control signal for controlling the switching frequency of the switching regulator. The third control circuit is coupled to receive the second control signal indicative of a peak current value for the current flowing through the switch circuit where the third control circuit provides an output signal responsive to the second control signal for controlling the peak current flowing through the switch circuit.

According to another aspect of the present invention, a method for controlling a switching regulator is described. The switching regulator receives an input voltage and includes a switch circuit coupled to generate a switching output voltage and an output circuit coupled to receive the switching output voltage and to supply current at a regulated output voltage to a load. The method includes generating an error voltage responsive to the difference between a first voltage and a reference voltage where the first voltage is indicative of the regulated output voltage, generating a first control signal having a magnitude proportional to the error voltage for error voltages in a first voltage range being associated with low voltage values of the error voltage where the first control signal has a maximum value for error voltage values greater than the first voltage range, and generating a second control signal having a minimum value for error voltages in a second voltage range being associated with low voltage values of the error voltage where the second control signal has a magnitude proportional to the error voltage for error voltages greater than the second voltage range. Finally, the method includes controlling the switching frequency of the switching regulator in response to the first control signal, and controlling the peak current flowing through the switch circuit in response to the second control signal, the second control signal being indicative of a peak current value for the current flowing through the switch circuit.

The present invention is better understood upon consideration of the detailed description below and the accompanying drawings.

DETAILED DESCRIPTION OF THE PREFERRED EMBODIMENTS

Figure 1:
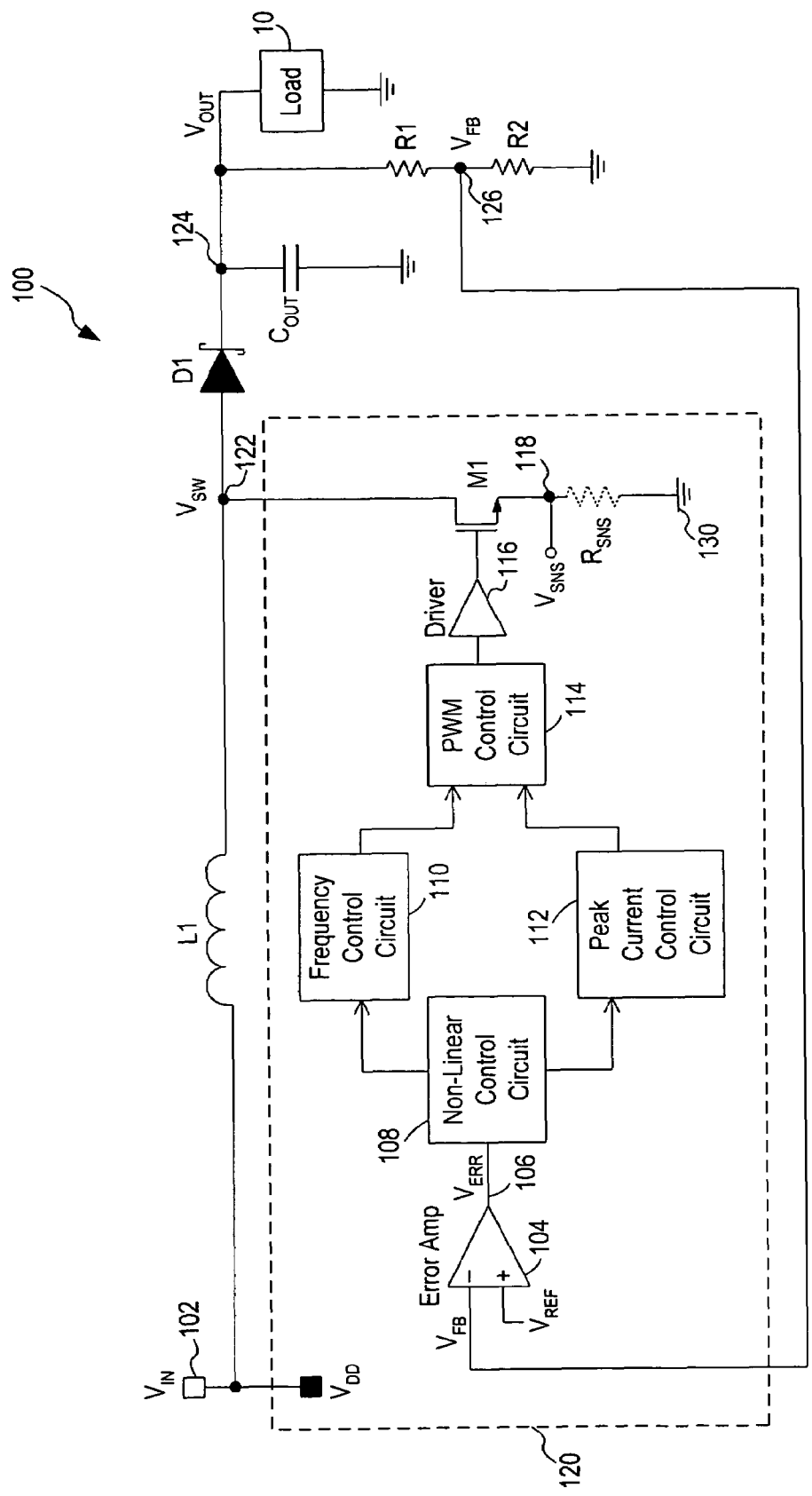
FIG. 1 is a schematic diagram of a boost switching regulator according to one embodiment of the present invention.

In accordance with the principles of the present invention, a switching regulator operates under a combination of variable off-time control (or frequency control) and variable peak current control to achieve high efficiency at a wide range of load conditions. In operation, the frequency control and the peak current control operate in conjunction over the entire range of load conditions with the frequency control dominates at light load (or low power) conditions and the variable peak current control dominates at heavy load (or high power) conditions. In effect, the two control schemes operate in parallel and the switching regulator transitions smoothly between frequency control and peak current control, with no defined operation boundary between the frequency control and peak current control. That is, the switching regulator operates under the continuous control of both the frequency control scheme and the peak current control scheme and does not toggle between the two control regimes.

More specifically, the switching regulator operates in a pulse frequency modulation regime under light load conditions where a low switching frequency is used to achieve low power loss to improve efficiency at light loads. However, with the parallel operation of the frequency control and the peak current control, the switching regulator effectuates continuous control during light load conditions so that the switching regulator is capable of responding quickly to changing load conditions. When the switching regulator detects high power demand from the load, the peak current control takes over to deliver power to the load to ensure optimal operation at all load conditions. In sum, the switching regulator of the present invention overcomes the limitations of the prior art by applying PFM over a limited operation range while providing continuous control under light load conditions so that the switching regulator can transition rapidly to peak current control in response to changing load conditions.

The switching regulator of the present invention achieves high efficiency at light load conditions while avoiding many of the shortcomings of the conventional solutions. First, the switching regulator of the present invention implementing parallel frequency/peak current control allows for continuous control at all load conditions. Therefore, the switching regulator can respond to changing load conditions instantly without the delay associated with toggling between different operation modes, as in the case of the prior art. Second, by using PFM scheme only during light load conditions, the switching regulator avoids the use of a wide range of operating frequency to support a wide range of output power. Under the peak current control, the switching regulator operates at a fixed frequency for moderate to high output power levels. The switching regulator avoids modulating to high frequency where efficiency can be compromised.

In the following description, the switching regulator in which the parallel frequency/peak current control scheme of the present invention is implemented is illustrated as a boost switching regulator or a boost converter. The use of a boost converter in the present description is illustrative only and is not intended to be limiting. The parallel frequency/peak current control scheme of the present invention can be implemented all types of switching regulators, including boost, buck or boost-buck regulators, to improve efficiency over a wide operating range.

FIG. 1 is a schematic diagram of a boost switching regulator according to one embodiment of the present invention. Referring to FIG. 1, a boost converter 100 includes a switching and control circuit 120, an inductor L1 a diode D1, and an output capacitor $C_{OUT}$. The boost converter 100 receives an input voltage $V_{IN}$ on a node 102 and provides an output voltage $V_{OUT}$ having a substantially constant magnitude on a node 124 for driving a load 10. A voltage divider circuit including resistors R1 and R2 divides down the output voltage $V_{OUT}$ to provide a feedback voltage $V_{FB}$ (on node 126) to be fed back to the switching and control circuit 120 to provide regulation and control of the output voltage.

Switching and control circuit 120 includes an error amplifier 104 for receiving the feedback voltage $V_{FB}$ and a reference voltage $V_{REF}$ and providing an error output voltage $V_{ERR}$ on a node 106 responsive to the difference between the feedback voltage and the reference voltage. The error output voltage $V_{ERR}$ is processed by control circuitry in the switching and control circuit 120 to derive the control signals for driving a PWM control circuit 114. The control circuitry in switching and control circuit 120 implements the parallel frequency/peak current control functions in accordance with the present invention and will be described in more detail below. The control circuitry generates control signals for the PWM control circuit 114 which operates to generate the control signals for driving the switch circuit or the power switch. In the present illustration, PWM control circuit 114 controls a driver circuit 116 for driving an NMOS transistor M1 as the power switch.

Power switch M1, driven by the PWM control circuit 114, has a source terminal coupled to the ground voltage (node 130) or a negative power supply voltage $V_{SS}$ and a drain terminal (node 122) coupled to provide a switching output voltage $V_{SW}$. Inductor L1 is coupled between the input voltage $V_{IN}$ (node 102) and the switching output voltage $V_{SW}$ (node 122). In the present illustration, a resistor $R_{SNS}$ is coupled between the source terminal (node 118) and the ground voltage (node 130) to sense the output current level. A voltage $V_{SNS}$ is thus developed at node 118 indicative of the current flowing through power switch M1 and inductor L1. Resistor $R_{SNS}$ is optional and other methods for sensing the output current level of boost converter 100 can be used.

Diode D1 has its anode connected to the switching output voltage $V_{SW}$ (node 122) and its cathode connected to the output voltage $V_{OUT}$ (node 124). In the present illustration, diode D1 is a Schottky diode but other types of semiconductor junction diodes can be used. The use of a Schottky diode for diode D1 in FIG. 1 is illustrative only. Furthermore, it is also known to implement diode D1 using a controlled switch, such as a PMOS transistor. Output capacitor $C_{OUT}$ is connected between the output voltage $V_{OUT}$ and the ground voltage.

The basic operation of boost converter 100 for providing a regulated output voltage $V_{OUT}$ having a substantially constant magnitude is as follows. When PWM control circuit 114 drives the power switch M1 to turn the power switch on, inductor L1 has the input voltage $V_{IN}$ impressed upon it, and the current through the inductor builds up. When the PWM control circuit 114 drives the power switch M1 to turn off the power switch, the voltage across the inductor L1 reverses (flies back) and inductor L1 dumps energy through the diode D1 onto the output capacitor $C_{OUT}$ and the load 10.

In accordance with the present invention, boost converter 100 implements a control scheme whereby efficiency at light load conditions is improved and the performance of the converter for all load conditions is maintained or enhanced. More specifically, boost converter 100 includes a non-linear control circuit 108, a frequency control circuit 110 and a peak current control circuit 112 in control circuit 120 for implementing a parallel frequency/peak current control scheme. Non-linear control circuit 108 receives and processes the error voltage $V_{ERR}$ (node 106) from error amplifier 104. Based on the value of the error voltage $V_{ERR}$, non-linear control circuit 108 determines whether boost converter 100 is operated under a low power (light load) condition or a high power (moderate to heavy load) condition. Non-linear control circuit 108 provides control signals to the frequency control circuit 110 and the peak current control circuit 112 to direct the two control circuits 110 and 112 to generate control signals for driving PWM control circuit 114.

In operation, both frequency control circuit 110 and peak current control circuit 112 provide continuous control to PWM control circuit 114. However, depending on the output power requirement detected by non-linear control circuit 108, one of the two control circuits 110, 112 will dominate to cause boost converter 100 to operate under either a frequency control regime (or PWM regime) or a peak current control regime.

More specifically, when non-linear control circuit 108 detects a light load condition where boost converter 100 needs to operate at a low power level, non-linear control circuit 108 generates control signals to cause frequency control circuit 110 to dominate the operation of PWM control circuit 114 and thereby the switching of power switch M1. Peak current control circuit 112 sets the peak current of the inductor at a low level so that boost converter 100 operates in the discontinuous current regime where the inductor current goes to zero. The peak current level is kept constant at a low level while the switching frequency of power switch M1 is varied to deliver the required amount of energy to inductor L1.

The energy transferred to inductor L1 per switching cycle is given as: $1/2*L*I^2$, where L is the inductance of inductor L1 and I is the current flowing through the inductor. By reducing the peak current that is allowed to flow through inductor L1, the energy transferred per switching cycle can be reduced. For instance, if the peak current is set to one-fourth of the nominal value, then the energy transferred is reduced by a factor of 16 per switching cycle. Thus, boost converter 100 can then operate at 16× the switching frequency at low power. Thus, at light load conditions, frequency control circuit 110 drives PWM control circuit 114 to operate with variable frequency at the reduced peak current level where the switching frequency is kept sufficiently high to be out of the audio range.

On the other hand, when non-linear control circuit 108 detects a moderate to heavy load condition where boost converter 100 needs to operate at a high power level, non-linear control circuit 108 generates control signals to cause peak current control circuit 112 to dominate the operation of PWM control circuit 114 and thereby the switching of power switch M1. Frequency control circuit 110 maintains the switching frequency of boost converter 100 at a reasonable value while peak current control circuit 112 adjusts the peak current of the inductor to control the energy transfer. Boost converter 100 is thus operated in the continuous current regime where the inductor current does not go to zero. By operating in the continuous mode with variable peak current, the energy transferred to the inductor per switching cycle can be increased to support the high power demand.

Non-linear control circuit 108 examines the error voltage $V_{ERR}$ to determine the load condition under which boost converter 100 is operated. Error voltage $V_{ERR}$ has a voltage value responsive to the voltage difference between the feedback voltage $V_{FB}$ and the reference voltage $V_{REF}$. In one embodiment, error voltage $V_{ERR}$ has a small value to indicate low power condition and a large value to indicate high power condition.

A salient characteristic of the parallel frequency/peak current control scheme implemented in the switching regulator of the present invention is that both the frequency control scheme and the peak current control scheme are operated continuously with one scheme dominating the other depending on the output load conditions. There is a broad transition region between the two control regimes with continuous loop gain throughout the transition region. The switching regulator does not change abruptly from one operating mode to another, as is the case in the prior art solutions.

The implementation and operation of the parallel frequency/peak current control scheme in boost converter 100 will now be described in detail. In boost converter 100, a control loop is established by feeding back the feedback voltage $V_{FB}$ to the error amplifier 104 in switching and control circuit 120 for generating the control signals to drive power switch M1. Error amplifier 104 provides high DC gain to the control loop, where the loop gain decreases with increasing frequency. The AC response of error amplifier 104 is used to provide feedback compensation for the control loop.

The error output voltage $V_{ERR}$ of error amplifier 104 is coupled to non-linear circuit 108. The non-linear circuit 108 generates a first signal for frequency control circuit 110 in the form of a timer current having a current value being proportional to the error output voltage $V_{ERR}$. The non-linear circuit 108 generates a second signal for peak current control circuit 112 in the form of a voltage value indicative of a program peak current where the program peak current is also proportional to the error output voltage $V_{ERR}$.

Frequency control circuit 110 implements a timer function and provides a time value for determining the off-time of power switch M1, that is, the duration in which power switch M1 is turned off. The duration of the off-time is a function of the timer current indicated by the first signal and the off-time value is therefore proportional to the error voltage value $V_{ERR}$. In this manner, the off-time value is varied according to the error voltage $V_{ERR}$ to modulate the frequency of the switching cycle, thereby realizing frequency control in the control loop.

Peak current control circuit 112 implements a peak current comparison function where the voltage value of the second signal is compared with a sensed voltage, such as voltage $V_{SNS}$ (node 118), indicative of the current flowing through power switch M1. The second signal has a voltage value that indicates the desired peak current value for the boost converter and is a function of the error output voltage $V_{ERR}$. In peak current control circuit 112, the program peak current is compared with the instantaneous current in the power switch for realizing peak current control in the control loop.

In operation, at the start of each switching cycle, power switch M1 is turned on and peak current control circuit 112 compares the instantaneous current in the power switch M1, as measured by voltage $V_{SNS}$, to the program peak current (the second signal) as determined by the error voltage $V_{ERR}$ of the error amplifier 104. When the current flowing through the power switch M1 exceeds the program peak current value, the peak current control circuit 112 instructs PWM control circuit 114 to turn off the power switch M1. In a conventional current mode control scheme, the power switch would turn on again at the beginning of the next switching cycle as determined by a fixed oscillator. However, in accordance with the parallel frequency/peak current control scheme of the present invention, the duration of the off-time of the power switch is controlled by the timer current coupled to the frequency control circuit where the timer current is proportional to the error voltage $V_{ERR}$. The off-time duration may be variable depending on the output power condition of the boost converter. When the off-time duration times out, frequency control circuit 110 instructs PWM control circuit 114 to turn on power switch M1 to start a new switching cycle.

As thus operated, the switch on-time for each switching cycle is determined by the program peak current, which is a function of the error output voltage, and the rate of change of the switch current, which is set by the input voltage $V_{IN}$, the inductance of the inductor L1 and, in the continuous regime, the current value flowing when the switching cycle begins. The switch off-time for each switching cycle is controlled by the timer current which is also a function of the error output voltage of the error amplifier.

The non-linear control circuit 108, the frequency control circuit 110 and the peak current control circuit 112 operate in conjunction to regulate the control loop of boost converter 100 to enable the boost converter to respond rapidly to a wide range of load conditions. In the control loop, the error voltage $V_{ERR}$ from the error amplifier 104 drives the timer current and the program peak current through the non-linear circuit 108. When the error voltage $V_{ERR}$ is low, indicating low power demand from the load 10, the program peak current is clamped to a minimum value while the first signal controlling the timer function in the frequency control circuit 110 has a current value that is effectively proportional to the error voltage $V_{ERR}$. Thus, at light load conditions, the boost converter is operated in a PFM regime where the switching frequency is varied by the timer function but the program peak current holds the peak current of the power switch constant at some minimal level to improve efficiency.

When the error voltage $V_{ERR}$ increases to some moderate value, indicating moderate load condition, the timer current becomes clamped at a given maximum value. When the timer current becomes clamped, the program peak current becomes unclamped and becomes proportional to the error voltage $V_{ERR}$. Thus, as the load demand starts to increase, the boost converter shifts towards a peak current control regime where the switching frequency becomes fixed by the clamped timer current and the program peak current varies to supply power to the load. The program peak current increases to a predetermined maximum current limit representing the maximum peak current for the boost converter. In FIG. 1, the circuitry for setting the maximum current limit for the boost converter is not shown but such circuitry is conventional and well known to one of ordinary skill in the art. For instance, a current limit detect circuit can be included to provide a control signal to the PWM control circuit to turn off power switch M1 when the peak current limit is reached.

Figure 4:
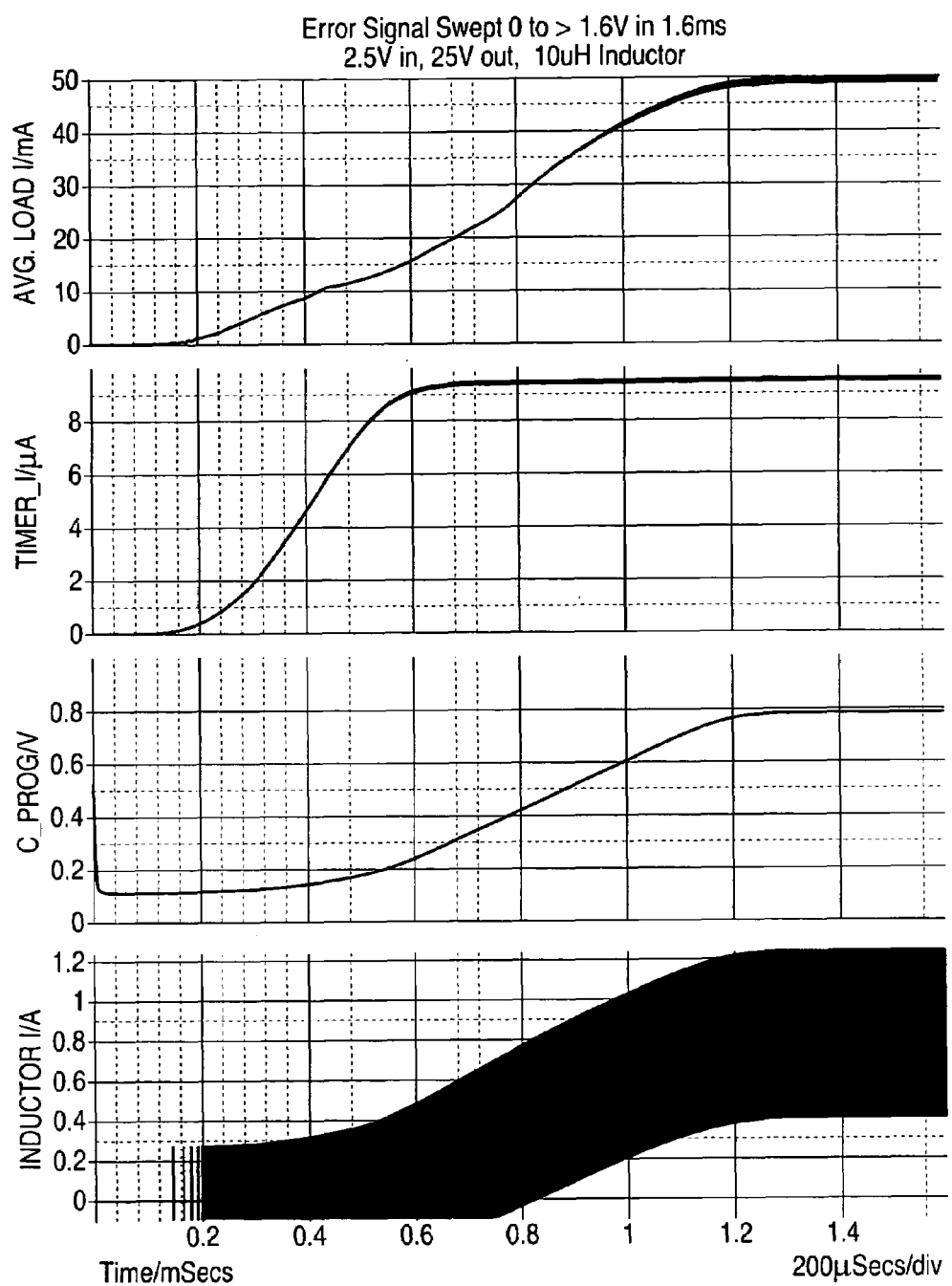
FIG. 4 includes plots for illustrating the operation of the boost switching regulator in a first exemplary mode.
Figure 5:
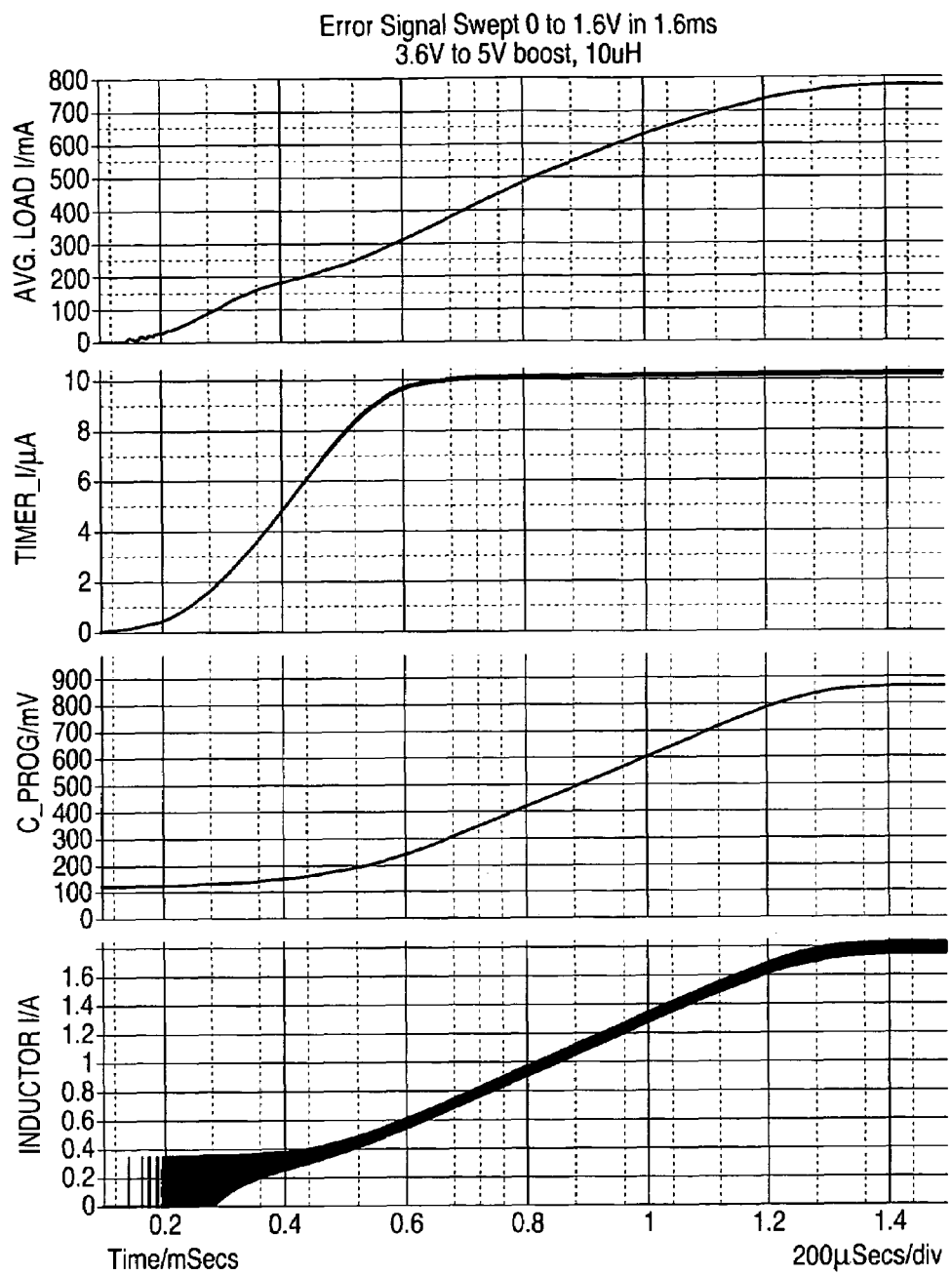
FIG. 5 includes plots for illustrating the operation of the boost switching regulator in a second exemplary mode.

The operation of the parallel frequency/peak current control scheme in a boost converter of the present invention is illustrated by the graphs shown in FIGS. 4 and 5. In both figures, the error voltage $V_{ERR}$ is swept from 0V to 1.6V to illustrate the response of the boost converter to changing load conditions from a light load to a heavy load. In FIG. 4, the boost converter receives an input voltage $V_{IN}$ of 2.5V and provides an output voltage $V_{OUT}$ of 20V, representing an 8× voltage boost. In FIG. 5, the boost converter receives an input voltage of 3.6V and provides an output voltage $V_{OUT}$ of 5V, representing a 1.5× voltage boost. As can be observed from FIGS. 4 and 5, the two boost converters operate in the same manner to transition from frequency control regime (discontinuous operation) at light load to peak current control regime (continuous operation) at heavy load. The only difference in the operation of the two boost converters is the load current value at which the transition from one operation regime to another starts.

In each of FIGS. 4 and 5, the top graph illustrates the load current. As the voltage $V_{ERR}$ of the error amplifier increases, the load current increases accordingly. The second graph of each figure illustrates the timer current generated by the non-linear circuit. The third graph of each figure illustrates the second signal (c_prog) voltage value generated by the non-linear circuit which is indicative of the program peak current. The last graph in each figure illustrates the inductor current.

As can be seen from both FIGS. 4 and 5, as the load current increases in the light load regime (from about 0.2 to 0.6 mS), the timer current increases and the switching frequency is generally proportional to the timer current. As the load current continues to increase into the moderate load regime, the timer current reaches a maximum value of about 10 μA and is clamped at this maximum current value. The switching frequency thus becomes substantially fixed. At this time (from about 0.6 mS to 1.2 mS), the program peak current increases proportional to the load current. The boost converter is thus operated under peak current control regime. The program peak current continues to increase until the program peak current reaches a maximum current value, as depicted by the c_prog voltage reaching a maximum voltage value of 0.6V.

The boost converter continues to drive the heavy load using fixed frequency and fixed peak current control.

As can be observed from FIGS. 4 and 5, the boost converters in accordance with the present invention operate under the parallel control of the PFM (frequency control) regime and the peak current control regime. The boost converters do not switch between one operation mode to another but rather transition between the two control regimes in a smooth and continuous manner. Thus, the boost converters of the present invention can realize continuous loop gain through varying load condition and can realize fast response to changing load conditions, a result not readily achievable by prior art solutions.

The boost converter of the present invention implementing parallel frequency/peak current control schemes provides another advantage not attainable by prior art solutions. Specifically, a known problem related to fixed frequency control of boost converters is the requirement for slope compensation to prevent subharmonic oscillation. First, in a PWM controlled switching regulator, the output voltage $V_{OUT}$ of the switching regulator is regulated by controlling the duty cycle (or by varying the pulse width) of the rectangular switching voltage $V_{SW}$ applied to the output filter circuit (the inductor and capacitor network). In general, "duty cycle" refers to the percentage of time in a switching cycle a power switch is turned on to cause the inductor current to increase. In general, if the output voltage $V_{OUT}$ is too low, the feedback control loop increases the duty cycle so as to increase the amount of energy delivered to the inductor. If the output voltage $V_{OUT}$ is too high, the feedback control loop decreases the duty cycle so as to decrease the amount of energy delivered to the inductor.

When a switching regulator is operated at high duty cycles in the continuous mode, a small perturbation in the duty cycle may for instance increase the on-time of the power switch. This results in a small error in the peak current. But the lengthened switch on-time results in a shortened switch off-time at a given frequency, and may result in a larger perturbation on the final current value at the end of the switching cycle. The small perturbation in the duty cycle in one switching cycle results in the following switching cycle being shorter than normal, and by an amount larger than the original perturbation. The subsequent cycle would then be lengthened, and so on in a growing progression leading to a short pulse/long pulse oscillation. Prior art solutions to this oscillation problem involve the addition of an additional element in the converter control loop, referred to as a "slope compensation" ramp. The slope compensation ramp is effectively added to the peak current information. However, the configuration of this slope compensation circuit is problematic, particularly in the case of circuits which must operate at low voltage.

The switching regulator of the present invention avoids the need for any slope compensation by using a timed off-time for the power switch. In the prior art, the switch off-time was reduced any time the on-time was perturbed because of the fixed overall period. However, in accordance with the present invention, the off-time is not complementary to the on-time but rather is set by the control loop through the error voltage $V_{ERR}$ and the timer current generated by the non-linear control circuit. Thus, any perturbation of the on-time is not "amplified" by the opposing change in the off-time, and the perturbation does not progressively grow with succeeding cycles. Thus, slope compensation is not needed in the switching regulators of the present invention.

The detail implementation of the non-linear control circuit, the frequency control circuit and the peak current control circuit in the switching regulator of the present invention will now be described in detail. It is understood that the remaining components and circuit elements need to construct a complete switching regulator circuit, such as the PWM control circuit and the error amplifier, are well known in the art and can be implemented using any techniques and circuits presently known or to be developed.

Figure 2:
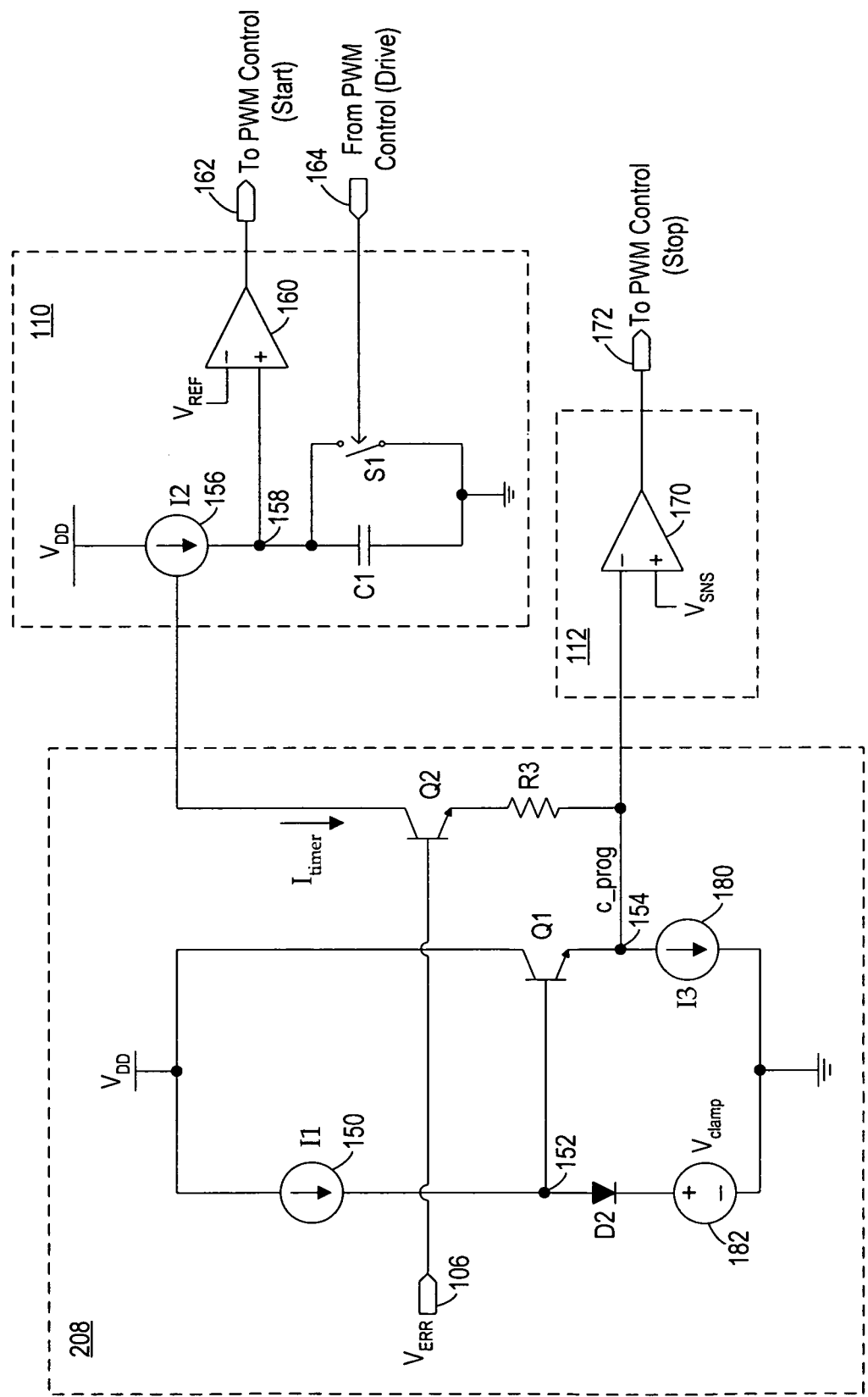
FIG. 2 is a schematic diagram of the non-linear control circuit, the frequency control circuit and the peak current control circuit according to one embodiment of the present invention.

FIG. 2 is a schematic diagram of the non-linear control circuit, the frequency control circuit and the peak current control circuit according to one embodiment of the present invention. The construction of the frequency control circuit 110 and the peak current control circuit 112 is first described.

Referring to FIG. 2, frequency control circuit 110 includes a capacitor C1 and a switch S1 connected in parallel to implement a timer function. The frequency control circuit receives an input signal, the first signal, in the form of a timer current $I_{timer}$ from the non-linear circuit. The current $I_{timer}$ operates to charge capacitor C1 when the capacitor is not being discharged. As described previously and will be explained in more detail below, the timer current $I_{timer}$ is a function of the error voltage $V_{ERR}$ of the error amplifier. Switch S1 is controlled by a signal from the PWM control circuit to close the switch when the power switch is to be turned on and to open the switch when the power switch is to be turned off. For example, the "drive" signal from the PWM control circuit can be used to control switch S1.

In operation, switch S1 is closed to hold capacitor C1 in a discharged state when the power switch is turned on. When the off-time is initiated by the peak current control circuit, switch S1 opens to allow the timer current $I_{timer}$, or a scaled replica of the timer current $I_{timer}$, to charge capacitor C1. A comparator 160 senses the voltage across capacitor C1 (at node 158). When the voltage across capacitor C1 reaches a predetermined reference voltage $V_{REF}$, comparator 160 generates an output signal on node 162 indicating the end of the off-time for the power switch. The output signal from frequency control circuit 110 instructs the PWM control circuit to start the next switching cycle. The power switch is turned on again and switch S1 is again closed to discharge capacitor C1, until the end of the on-time in the current switching cycle.

The charging and discharging of capacitor C1 form a timer function in frequency control circuit 110 for controlling the off-time of the power switching. The timer provides a time delay that is proportional to the capacitance of the capacitor C1 and the voltage difference between the discharged voltage across capacitor C1 and the reference voltage $V_{REF}$, and inversely proportional to the timer current $I_{timer}$. Thus, when the timer current $I_{timer}$ is small, indicating a low error voltage and a corresponding low output power, the time delay is large to decrease the switching frequency. When the timer current $I_{timer}$ increases to a maximum value, indicating a high error voltage and a corresponding high output power, the time delay is at a minimal value to increase the switching frequency for delivering more energy to the output load.

In other words, the timer function in frequency control circuit 110 operates to vary the duty cycle of the boost converter based on the control signal—timer current $I_{timer}$—received from the non-linear control circuit. By varying the off-time of the power switching, the duty cycle of the switching regulator, defined as the percentage of time in a switching cycle a power switch is turned on, is varied in response to the load condition experienced by the boost converter. Specifically, during light load conditions, timer current $I_{timer}$ is small and the off-time is long, resulting in a small duty cycle. As the load demand increases, the timer current $I_{timer}$ increases and the off-time is shortened, resulting in a larger duty cycle. The frequency control circuit 110 controls the off-time of the power switch and in turns controls the duty cycle of the power switch.

Peak current control circuit 112 is implemented using a comparator 170. Peak current control circuit 112 receives a voltage c_prog (node 154) as the input signal, which is indicative of the program peak current to be applied to the control loop of the switching regulator. Comparator 170 of peak current control circuit 112 receives voltage c_prog as well as a voltage indicative of the current flowing through the power switch and the inductor. In the present illustration, a voltage $V_{SNS}$, generated at the source terminal of power switch M1 across a sense resistor $R_{SNS}$, is coupled to comparator 170 to indicate the instantaneous current value of the power switch. Comparator 170 provides an output signal indicating when the sense voltage $V_{SNS}$ reaches the voltage value of voltage c_prog, indicating that the power switch has reaches the desired peak current value. The output signal from comparator 170 instructs the PWM control circuit to turn off the power switch (stop the on-time) because the desired peak current has been reached.

The construction of the non-linear circuit will now be described. In the present embodiment, non-linear control circuit 208 is constructed in a bipolar implementation. As described above, non-linear control circuit 208 receives the error output voltage $V_{ERR}$ (node 106) and generates a first signal $I_{timer}$ for driving the frequency control circuit 110 and a second signal c_prog for setting the program peak current for the peak current control circuit 112.

In non-linear control circuit 208 of FIG. 2, the error voltage $V_{ERR}$ is coupled to drive the base terminal of an NPN bipolar transistor Q2. The current flowing in the collector terminal of transistor Q2 is the current $I_{timer}$. A resistor R3 is connected between the emitter terminal of transistor Q2 and node 154 which is the voltage c_prog. Non-linear control circuit 208 further includes an NPN bipolar transistor Q1. The base terminal of transistor Q1 is biased to a predetermined voltage level by a current source 150 providing a current I1, a diode D2 and a voltage source 182 providing a voltage $V_{clamp}$. The emitter terminal of transistor Q1 is coupled to a current source 180 providing a current I3.

The operation of the non-linear control circuit 208 in FIG. 2 is as follows. When the error voltage $V_{ERR}$ is at a low voltage level, the base terminal of transistor Q1 sits at a voltage that is one diode drop higher than voltage $V_{clamp}$. Assuming that the base-to-emitter voltage $V_{BE}$ of transistor Q1 and the voltage drop across diode D2 are comparable, then the emitter terminal of transistor Q1 (node 154) forces voltage c_prog to a level comparable to voltage $V_{clamp}$. When the error voltage $V_{ERR}$ is held at a low level, transistor Q2 will be turned off and current $I_{timer}$ will have zero current. Current $I_{timer}$ will continue to have zero current value until the error voltage $V_{ERR}$ is at a level comparable to the voltage at the base terminal of transistor Q1. That is, transistor Q2 will start to turn on when its base voltage (the error voltage $V_{ERR}$) increases to a value of one diode drop plus voltage $V_{clamp}$.

As the error voltage $V_{ERR}$ rises above the voltage level at the base of transistor Q1, the current $I_{timer}$ increases at a rate of approximately 1/R3. As the current $I_{timer}$ increases, the voltage c_prog remains clamped at about the voltage $V_{clamp}$ value. However, as the current in transistor Q2 increases, the current in transistor Q1 decreases and voltage c_prog rises slightly accordingly. In this operation region, voltage c_prog remains relatively constant, but the current $I_{timer}$ increases essentially linearly.

Current $I_{timer}$ increases as the error voltage $V_{ERR}$ increases until current $I_{timer}$ grows to a value comparable to the fixed current I3 (current source 180). At this point, the current in transistor Q1 goes to zero and the voltage c_prog becomes unclamped. As the error voltage $V_{ERR}$ continues to increase, the current $I_{timer}$ remains essentially constant at the current value of I3, and the value of voltage c_prog increases directly with the error voltage $V_{ERR}$ with transistor Q1 and resistor R3 provides a fixed level shift of $(V_{BE}+(I3*R3))$.

As thus operated, non-linear control circuit 208 has three regions of operation. When the error voltage $V_{ERR}$ is at low voltage levels, the voltage c_prog is clamped to a fixed, controlled value $V_{clamp}$ representing a minimum value of program peak current. The current $I_{timer}$ is zero, yielding an arbitrarily long off-time. The control loop of the boost converter is thus held off and no power is delivered to the load.

As the error voltage $V_{ERR}$ increases above the very low voltage levels, voltage c_prog remains clamped at voltage $V_{clamp}$, thereby setting the peak current to a minimal peak current level. However, as voltage $V_{ERR}$ driving the base terminal of transistor Q2 increases, transistor Q2 turns on and current $I_{timer}$ starts to increase. Current $I_{timer}$ increases proportionally to the error voltage $V_{ERR}$, causing the off-time of the power switch to progressively decrease. In this operation region, the switch off-time is much larger than the switch on-time, and the switching cycle period is essentially the off-time. Thus, the switching frequency of the boost converter is essentially proportional to current $I_{timer}$ and therefore also proportional to error voltage $V_{ERR}$. The boost converter operates in a fixed peak current, variable switching frequency regime.

Finally, as current $I_{timer}$ continues to increase to a maximum level, as defined by current I3, current $I_{timer}$ becomes fixed while voltage c_prog becomes unclamped. Voltage c_prog, indicative of the program peak current, increases with increasing error voltage $V_{ERR}$ to allow the program peak current to increase. The switching frequency of the boost converter thus becomes fixed while the peak current varies in accordance with the error voltage $V_{ERR}$ to deliver the desired power to the load. In this operation region, the boost converter operates in a fixed frequency, variable peak-current regime.

Figure 3:
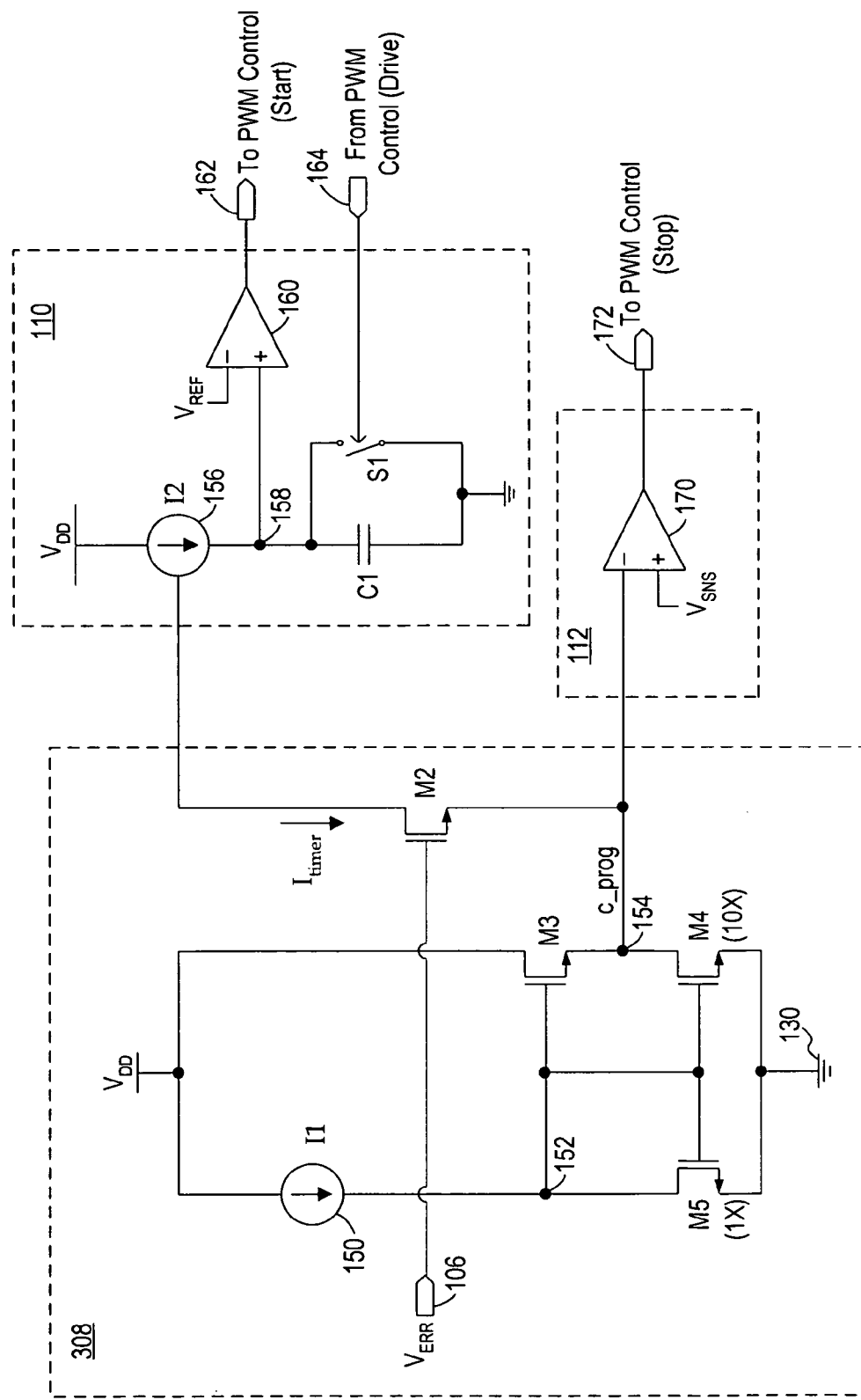
FIG. 3 is a schematic diagram of a non-linear control circuit according to an alternate embodiment of the present invention.

FIG. 3 is a schematic diagram of a non-linear control circuit according to an alternate embodiment of the present invention. In FIG. 3, the frequency control circuit and the peak current control circuit are constructed in the same manner as in FIG. 2 and will not be further described. Rather, FIG. 3 illustrates the construction of the non-linear circuit using CMOS transistors in an alternate embodiment of the present invention.

Referring to FIG. 3, a non-linear control circuit 308 includes an NMOS transistor M2 having a gate terminal coupled to receive the error voltage $V_{ERR}$. The current flowing in the drain terminal of transistor M2 is the current $I_{timer}$. The source terminal of transistor M2 (node 154) is the voltage c_prog. Because NMOS devices inherently have much lower transconductance than bipolar transistors, transistor M2 is equivalent to the combination of bipolar transistor Q2 and resistor R3 in the bipolar implementation of the non-linear control circuit shown in FIG. 2.

Non-linear control circuit 308 further includes an NMOS transistor M3. The gate terminal of transistor M3 is biased to a predetermined voltage level by a current mirror formed by NMOS transistors M4 and M5 and a current source 150 providing a current I1. Transistor M4 is 10 times transistor M5. Thus, when the current flowing through transistor M5 is I1, the current flowing through transistor M4 is 10*I1. When I1 is 1 µA, the current flowing through transistor M4 is 10 µA.

In non-linear circuit 308, the width and length of transistor M5 are selected to attain several hundred millivolts of voltage enhancement ($V_{enh}$) at a drain current of I1 (e.g. 1 μA). Thus, the gate voltage of transistor M5 (node 152) is the sum of the threshold voltage $V_{TH}$ of the transistor and the enhancement voltage $V_{enh}$. The same gate voltage also biases the gate terminal of transistor M3. The ratio of the width to length of transistor M3 is selected to be very large such that its gate-to-source voltage $V_{GS}$ at a drain current of 10*I1 (e.g. 10 μA) is not appreciably different from the transistor's threshold voltage $V_{TH}$. As thus configured, the voltage c_prog at the source terminal (node 154) of transistor M3 is substantially equal to the enhancement voltage $V_{enh}$.

In one embodiment, current I1 is set to 1 μA and the current mirrored by transistor M4 is thus 10 μA. NMOS transistor M5 has a width/length value of 12μ/6μ. NMOS transistor M4 can be formed by connecting 10 transistors having width/length value of 12μ/6μ in parallel. NMOS transistor M3 has a width/length value of 90μ/1.2μ. NMOS transistor M2 has a width/length value of 80μ/1.2μ.

The operation of the non-linear control circuit 308 in FIG. 3 is as follows. When the error voltage $V_{ERR}$ is at a low voltage level less than the threshold voltage $V_{TH}$ of transistor M2, transistor M2 is turned off and current $I_{timer}$ will have zero current. Meanwhile, transistor M3 clamps the voltage c_prog to a few hundred millivolts through the biasing of the current mirror of transistors M4 and M5. Voltage c_prog has a minimal value presenting a minimal program peak current value. Current $I_{timer}$ will continue to have zero current value until the error voltage $V_{ERR}$ increases to the threshold voltage $V_{TH}$ of transistor M2.

When the error voltage $V_{ERR}$ increases above the threshold voltage $V_{TH}$ of transistor M2, transistor M2 starts to conduct current and current $I_{timer}$ increases. When the error voltage $V_{ERR}$ increases to the same voltage value as the gate voltage of transistor M3, which is the sum of the enhancement voltage $V_{enh}$ and the threshold voltage $V_{TH}$, the current conducted by transistor M4 (10*I1) is split almost equally between transistors M2 and M3. By this operating point, voltage c_prog has already increased appreciably with increasing error voltage $V_{ERR}$, though at a substantially attenuated rate.

As the error voltage $V_{ERR}$ increases further, the full current 10*I1 conducted by transistor M4 flows in transistor M2 and the current $I_{timer}$ reaches its maximum value. Transistor M2 becomes a voltage follower and voltage c_prog then follows the error voltage $V_{ERR}$ with little attenuation.

As thus constructed, non-linear control circuit 308 has three regions of operation as in the case of non-linear control circuit 208 of FIG. 2. First, at very low error voltage values, transistor M2 is turned off so that the control loop of the boost converter is held off and no power is delivered to the load. Then, as the error voltage $V_{ERR}$ increases, transistor M2 turns on and current $I_{timer}$ increases while voltage c_prog remains fixed at a minimal value. The boost converter is thus operated at a variable frequency, fixed peak current regime. At a certain error voltage value, current $I_{timer}$ increases to a maximum current level of 10*I1 and is held at this maximum current level, thereby fixing the switching frequency. Meanwhile, voltage c_prog is unclamped and starts to increase to effectuate variable peak current control. The boost converter is thus operated at a fixed frequency, variable peak current regime.

Non-linear circuit 308 using CMOS implementation tends to be more gradual in its transitions between the different operating regions because of the much "softer" characteristics of gate-to-source voltage ($V_{GS}$) versus drain current ($I_D$). The gradual transition results in some variation in the program peak current even in the variable-frequency operation regime and some frequency modulation even when the circuit is primarily operating under peak current control. This gradual transition feature is in fact advantageous. As was shown in FIGS. 4 and 5 above, the operating mode of the boost converter transitions from a discontinuous state to a continuous state at a point that is a function of the input/output conditions of the switching regulator. The control laws for the switching regulator change at this transition. In order to guarantee a relatively smooth, easily stabilized loop gain, the gradualness of the control loop transition from one operating regime to another operating regime guarantees a reasonably continuous, if not altogether constant, value of loop gain.

The above detailed descriptions are provided to illustrate specific embodiments of the present invention and are not intended to be limiting. Numerous modifications and variations within the scope of the present invention are possible. The present invention is defined by the appended claims.

I claim:

1. A circuit for controlling a switching regulator, the switching regulator receiving an input voltage and including a switch circuit coupled to generate a switching output voltage and an output circuit coupled to receive the switching output voltage and to supply current at a regulated output voltage to a load, the circuit comprising:

an error amplifier having a first input node coupled to receive a first voltage indicative of the regulated output voltage, a second input node coupled to receive a reference voltage and an output node providing an error voltage responsive to the difference between the first voltage and the reference voltage;

a first control circuit having an input node receiving the error voltage, a first output node providing a first control signal and a second output node providing a second control signal, the first control circuit generating the first control signal having a magnitude proportional to the error voltage for error voltages in a first voltage range, the first control signal having a maximum value for error voltage values greater than the first voltage range, the first control circuit further generating the second control signal having a minimum value for error voltages in a second voltage range, the second control signal having a magnitude proportional to the error voltage for error voltages greater than the second voltage range, the first and second voltage ranges being associated with low voltage values of the error voltage;

a second control circuit coupled to receive the first control signal and providing an output signal responsive to the first control signal for controlling the switching frequency of the switching regulator; and a third control circuit coupled to receive the second control signal indicative of a peak current value for the current flowing through the switch circuit, the third control circuit providing an output signal responsive to the second control signal for controlling the peak current flowing through the switch circuit.

2. The circuit of claim 1, wherein the first and second control signals cause the switching regulator to operate with variable switching frequency and substantially fixed peak current when the error voltage is within the first voltage range and to operate with substantially fixed switching frequency and variable peak current when the error voltage is outside of the second voltage range.

3. The circuit of claim 1, wherein the second control signal has a maximum value for error voltage values greater than a third voltage range, the third voltage range being associated with high voltage values of the error voltage.

4. The circuit of claim 3, wherein the first and second control signals operate to cause the switching regulator to operate with substantially fixed switching frequency and substantially fixed maximum peak current when the error voltage is within the third voltage range.

5. The circuit of claim 1, wherein the maximum error voltage value of the first voltage range is different from the maximum error voltage value of the second voltage range.

6. The circuit of claim 5, wherein the maximum error voltage value for the first voltage range is greater than the maximum error voltage value of the second voltage range.

7. The circuit of claim 6, wherein the first and second control signals cause the switching regulator to operate with variable switching frequency and variable peak current when the error voltage is greater than the second voltage range but less than the first voltage range.

8. The circuit of claim 1, wherein the second control circuit provides the output signal to control an off-time of the switch circuit in response to the first control signal so as to vary the switching frequency of the switching regulator.

9. The circuit of claim 1, wherein the third control circuit provides the output signal to control the peak current value of the current flowing through the switch circuit, the output signal of the third control circuit turning off the switch circuit when the current flowing through the switch circuit reaches the peak current value indicative by the second control signal.

10. The circuit of claim 1, wherein the first voltage is a divided-down voltage of the regulated output voltage.

11. The circuit of claim 1, wherein the first control signal is a current signal and the second control signal is a voltage signal.

12. The circuit of claim 11, wherein the first control circuit comprises:
a first NPN bipolar transistor having a base terminal coupled to receive the error voltage, a collector terminal providing a first current as the first control signal and an emitter terminal;
a first resistor coupled between the emitter terminal of the first bipolar transistor and a first node;
a second NPN bipolar transistor having a base terminal biased to a second voltage, a collector terminal coupled to a positive power supply voltage and an emitter terminal coupled to the first node, the first node being biased to a third voltage as the second control signal; and
a current source coupled between the first node and a negative power supply voltage and providing a second current,
wherein when the error voltage is less than the second voltage, the first current is zero and the third voltage is clamped to a base-to-emitter voltage less than the second voltage; when the error voltage is greater than the second voltage, the first current is proportional to the error voltage while the third voltage remains clamped to a base-to-emitter voltage less than the second voltage; and when the first current has the same current value as the second current, the first current is clamped at the second current and the third voltage is proportional to the error voltage.

13. The circuit of claim 12, wherein the first control circuit further comprises:
a diode having an anode terminal coupled to the base terminal of the second NPN bipolar transistor and a cathode terminal;
a voltage source coupled between the cathode of the diode and the negative power supply voltage, wherein the voltage across the diode and the voltage source is the second voltage; and
a second current source providing a third current to the base terminal of the second NPN bipolar transistor and the diode.

14. The circuit of claim 11, wherein the first control circuit comprises:
a first NMOS transistor having a gate terminal coupled to receive the error voltage, a drain terminal providing a first current as the first control signal and a source terminal coupled to a first node;
a second NMOS transistor having a gate terminal biased to a second voltage, a drain terminal coupled to a positive power supply voltage and a source terminal coupled to the first node, the first node being biased to a third voltage as the second control signal; and
a current mirror coupled to mirror a second current into a third current being N times the second current, the current mirror providing the third current at the first node,
wherein when the error voltage is less than the threshold voltage of the first NMOS transistor, the first current is zero and the third voltage is clamped to a threshold voltage less than the second voltage; when the error voltage is greater than the threshold voltage of the first NMOS transistor, the first current is proportional to the error voltage while the third voltage remains clamped to a threshold voltage less than the second voltage; and when the first current has the same current value as the third current, the first current is clamped at the third current and the third voltage is proportional to the error voltage.

15. The circuit of claim 14, wherein the first control circuit further comprises:
third and fourth NMOS transistors forming the current mirror, the fourth NMOS transistor having a size N times the size of the third NMOS transistor, the third NMOS transistor receiving the second current and the fourth NMOS transistor providing the third current N times the second current,
wherein the third and fourth NMOS transistors have width and length selected to provide the second voltage at their gate terminals when the second current flows in the third NMOS transistor, the gate terminals of the third and fourth NMOS transistors being coupled to the gate terminal of the second NMOS transistor.

16. The circuit of claim 11, wherein the second control circuit comprises:
a capacitor and a switch connected in parallel between a second node and a negative power supply voltage, the capacitor having a first plate coupled to be charged by the first control signal; and
a comparator having a first input terminal coupled to receive a reference voltage and a second input terminal coupled to the second node, the comparator providing an output signal having a first state when the voltage at the second node is equal to or greater than the reference voltage,
wherein the switch is turned on to discharge the capacitor when the switch circuit is being turned on and the switch is turned off to allow the capacitor to be charged by the first control signal, thereby establishing an off-time for the switch circuit.

17. The circuit of claim 11, wherein the third control circuit comprises:
a comparator having a first input terminal coupled to receive the second control signal and a second input terminal coupled to receive a voltage signal indicative of the current flow through the switch circuit, the comparator providing an output signal having a first state when the second control signal has a voltage value that is equal to or greater than the voltage signal at the second input terminal.

18. A method for controlling a switching regulator, the switching regulator receiving an input voltage and including a switch circuit coupled to generate a switching output voltage and an output circuit coupled to receive the switching output voltage and to supply current at a regulated output voltage to a load, the method comprising:

generating an error voltage responsive to the difference between a first voltage and a reference voltage, the first voltage being indicative of the regulated output voltage;

generating a first control signal having a magnitude proportional to the error voltage for error voltages in a first voltage range being associated with low voltage values of the error voltage, the first control signal having a maximum value for error voltage values greater than the first voltage range;

generating a second control signal having a minimum value for error voltages in a second voltage range being associated with low voltage values of the error voltage, the second control signal having a magnitude proportional to the error voltage for error voltages greater than the second voltage range;

controlling the switching frequency of the switching regulator in response to the first control signal; and controlling the peak current flowing through the switch circuit in response to the second control signal, the second control signal being indicative of a peak current value for the current flowing through the switch circuit.

19. The method of claim 18, wherein generating the second control signal has a maximum value for error voltage values greater than a third voltage range, the third voltage range being associated with high voltage values of the error voltage.

20. The method of claim 18, wherein the first and second control signals cause the switching regulator to operate with variable switching frequency and substantially fixed peak current when the error voltage is within the first voltage range and to operate with substantially fixed switching frequency and variable peak current when the error voltage is outside of the second voltage range.

21. The method of claim 19, wherein the first and second control signals operate to cause the switching regulator to operate with substantially fixed switching frequency and substantially fixed maximum peak current when the error voltage is within the third voltage range.

22. The method of claim 18, wherein the maximum error voltage value for the first voltage range is greater than the maximum error voltage value of the second voltage range.

* * * * *